Aug. 29, 1933.  E. S. MERRIAM  1,924,648
PREFORMED ABRASIVE AND PROCESS OF PRODUCING THE SAME
Filed July 18, 1932
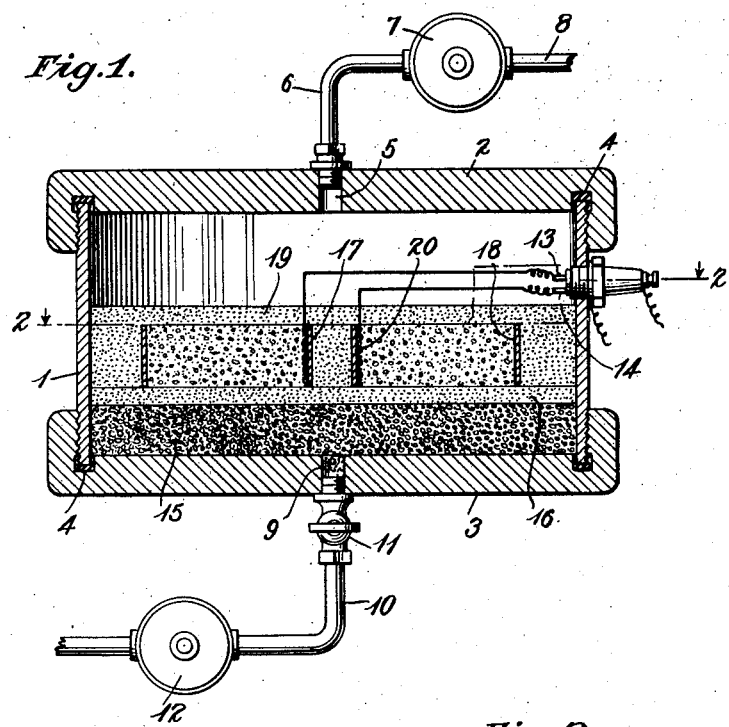
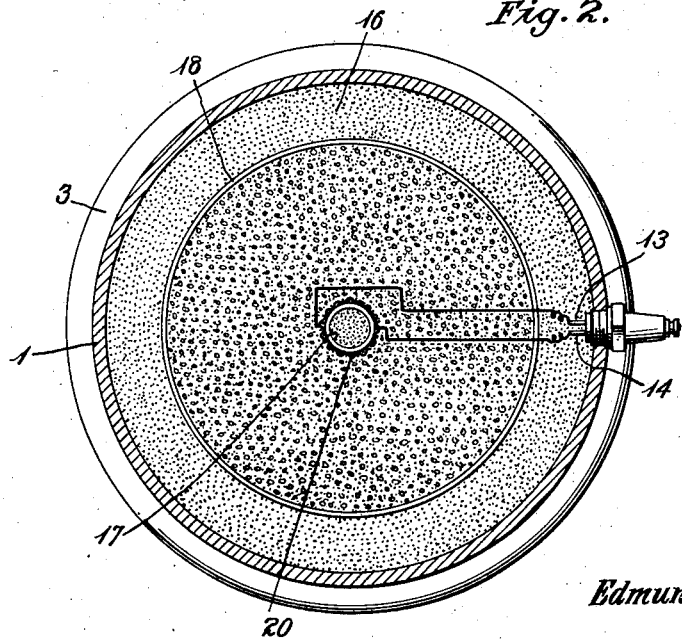
Inventor
Edmund S. Merriam
By James P. Burns
Attorney Patented Aug. 29, 1933

1,924,648

UNITED STATES PATENT OFFICE 1,924,648

PREFORMED ABRASIVE AND PROCESS OF PRODUCING THE SAME

Edmund S. Merriam, Marietta, Ohio

Application July 18, 1932. Serial No. 623,305

4 Claims. (Cl. 51—278)

This invention relates to a novel preformed abrasive and process for producing the same.

The invention has particular application to the manufacture of abrasive wheels, segments, and the like.

Heretofore pre-formed abrasive articles have been largely made by bonding together suitable abrasive grains by various admixed bonding materials, the more commonly used abrasive materials being silicon carbide, and fused aluminum oxide. The bonding materials employed for consolidating the abrasive grains generally constitute a vitreous ceramic body or glass, sodium silicate, rubber, shellac, bakelite or like suitable substances.

The vitrified bond is most widely employed. In the prior art processes the bonding agent is made to unite the abrasive grains by procedure involving the mixing, molding, drying and finally heat treating the article. When the vitrified bond is employed, the final heating step is effected in a kiln at temperatures above 1,000° C. The whole operation for making the pre-formed abrasive article frequently takes as long as two weeks. The entire process of manufacturing the vitrified abrasive wheels or segments calls for very close operating control.

The bonding agent of the so-called vitreous bonded abrasive article is softer and of lower strength than the material of the bonded abrasive grains and preferably must have a coefficient of thermal expansion closely approximating that of the abrasive grains.

The method comprehended by the present invention departs from the usual methods in several respects. First, no extraneous bonding agent is present in the finished bonded abrasive article. Secondly, the heat employed to form the bond is generated within the abrasive mixture rather than coming from an outside source.

In its more specific aspect, the invention relates primarily to the bonding of aluminum oxide abrasive grains by burning metallic aluminum in an atmosphere of oxygen in the presence of the grains to be bonded. The operation is preferably carried out under a relatively high pressure. The resultant bonded abrasive article contains only aluminum oxide, there being present in the bonded abrasive no extraneous bonding material and no deleterious impurities.

In carrying out my improved process to produce the novel abrasive of my invention, I do not effect other than a superficial fusion of the aluminum oxide grains themselves but rather bond the aluminum oxide grains together with the aluminum oxide resulting from the combustion of the metallic aluminum, which latter oxide will of necessity be at the instance of its formation in a liquid state.

From the known heat of formation and the specific heat of aluminum oxide, it can be calculated that about 7 parts by weight of metallic aluminum when burned will heat approximately 100 parts of aluminum oxide to a point of incipient fusion in the neighborhood of 2000° C. It will be appreciated that the temperature in the immediate vicinity of each burning particle of metallic aluminum is very high, probably around 3000° C. But this temperature, it will likewise be appreciated, exists only momentarily, and at the point of burning of the metallic aluminum particle.

By carefully regulating the quantity of metallic aluminum employed in bonding the aluminum oxide grains, the heat generated by the burning of the metallic aluminum can be so regulated as to give any desired degree of bonding while avoiding complete fusion of the aluminum oxide grains.

The metallic aluminum to be used for bonding the aluminum oxide grains is preferably sprayed on the aluminum oxide grains as a coating, though, however, it may be employed in the form of a dust, grains of small size, cuttings, turnings, filings or the like.

When an abrasive article such as an abrasive wheel, is formed in accordance with the present invention, the final bonding agent, namely, aluminum oxide, formed by the burning of the metallic aluminum in an atmosphere of oxygen, is the same as the material constituting the abrasive grains of the wheel. Both are of equal hardness and of equal thermal expansion. The improved pre-formed abrasives can thus be manufactured without the requirement of the customary expensive molds, presses, or kilns.

The improved method of the present invention requires no final drying or long continued kiln firing. An abrasive wheel or the like can be completely finished in a matter of hours instead of requiring many days as has heretofore been the practice.

One illustrative mode of carrying out the invention will be described in connection with the apparatus disclosed in the accompanying drawing in which,—

Figure 1 is a vertical sectional view showing a suitable apparatus and mode of carrying out the invention;

Fig. 2 is a sectional view taken on the line 2—2 of Figure 1.

Referring to the drawing, there is provided a suitable retort 1 of cylindrical form having a removable top 2 and bottom 3, each constructed to have a gas-tight fit with the ends of the cylindrical wall of the retort 1, as shown at 4. The cover 2 is provided with an inlet opening 5 to which an oxygen supply line 6 is adapted to deliver substantially pure oxygen under superatmospheric pressure from the pressure regulator 7, which derives its charge from some suitable source of supply through line 8.

The retort 3 is provided with an outlet opening 9 with which a vent pipe 10 communicates, a relief valve 11 being disposed therein. The vent pipe may, if desired, have connection with evacuating pump 12. A pair of electric terminals 13 and 14 extend through the wall of the retort 1 and are adapted to be connected in a suitable electric circuit. These terminals may take the form of a suitable plug.

The retort is charged as follows:—The cover 2 is removed and a layer 15 of coarse aluminum oxide grains of considerable thickness is placed on the bottom 3 of the retort. On top of the layer 15 of coarse aluminum oxide grains there may advantageously be disposed a comparatively thin layer 16 of finer aluminum oxide grains. At this point, if the abrasive article is to be an abrasive wheel, a central cylinder 17 of metal or paper is positioned centrally of the retort with its lower end resting on the layer of fine aluminum oxide particles. A second cylinder or ring 18 of a size corresponding to that of the wheel which it is desired to produce is set in the retort concentrically with respect to the ring 17. The annular space between the rings 17 and 18 is then filled with a suitable mixture of aluminum oxide grains and metallic aluminum or preferably with aluminium oxide grains having an appropriate coating of metallic aluminum. The proportion of the metallic aluminum to the metallic oxide will, of course, be so controlled as to give the requisite degree of bonding without fusing the aluminum oxide. The space between the ring 18 and the retort wall 1 and the space on the interior of the ring 17 is next filled with aluminum oxide grains, after which the rings 17 and 18 may be removed, following which the charge is covered over with a final layer 19 of relatively fine aluminum oxide grains.

To effect ignition of the metallic aluminum an iron screen or grid member 20 is preferably placed beforehand directly around the central ring 17 connected by suitable electric leads in the circuit of the terminals 13 and 14.

The cover 2 is next closed so that the retort is gas-tight. The retort is then evacuated. Oxygen is then forced through the retort and the charge to remove the residual nitrogen content and create in the retort an atmosphere of substantially pure oxygen. The oxygen pressure is built up to the desired amount. The electric circuit is then closed and the ignition grid is heated to incandescence and immediately burns in the oxygen. The hot iron oxide ignites the metallic aluminum. The burning of the aluminum occurs locally and continues until it has been effected throughout the zone occupied by the mixture of the aluminum oxide and the metallic aluminum. Oxygen is, of course, continuously supplied during the period of combustion.

The cover 2 can then be removed and the bonded wheel after cooling taken out of the retort and dressed to final size and shape.

In order to facilitate the ignition of the metallic aluminum, it may in some instances be advantageous to employ with the metallic aluminum small quantities of metallic zinc, metallic iron, or other metal which ignites more readily. Such metals may be termed ignition accelerators.

The description and illustrative mode of carrying out the invention herein contained is given as illustrative and not in limitation of the invention which is embraced in the appended claims.

Having thus described my invention, what I claim is:—

1. A process for producing pre-formed aluminous abrasives comprising bonding aluminum oxide grains by additional aluminum oxide formed in situ by the burning of metallic aluminum in an atmposhere of oxygen.

2. A process for producing pre-formed aluminous abrasive articles comprising forming a mass of aluminum oxide grains and metallic aluminum in the shape of the desired abrasive article and effecting burning of the metallic aluminum to thereby produce additional aluminum oxide and bond the aluminum oxide grains together.

3. A process for producing pre-formed abrasive articles comprising mixing abrasive grains of aluminum oxide with metallic aluminum and effecting burning of the metallic aluminum in the mixture to bond the abrasive grains by the resulting oxidized metal.

4. A method of bonding abrasive grains comprising mixing with the grains a combustible material, forming the mixture into the desired shape and effecting ignition of the combustible material in the mixture, whereby the abrasive grains are bonded together by the reaction products of the combustion.

EDMUND S. MERRIAM.